(12) United States Patent
Bonanni, III et al.

(10) Patent No.: US 10,636,109 B2
(45) Date of Patent: Apr. 28, 2020

(54) TRANSPORTATION ASSET MANAGEMENT BY VISUALLY DISTINGUISHABLE IDENTICONS

(71) Applicant: SwiftStar, Austin, TX (US)

(72) Inventors: Peter A. Bonanni, III, Austin, TX (US); Sarah W. French, Austin, TX (US)

(73) Assignee: SwiftStar, Austin, TX (US)

( * ) Notice: Subject to any disclaimer, the term of this patent is extended or adjusted under 35 U.S.C. 154(b) by 284 days.

(21) Appl. No.: 15/883,631

(22) Filed: Jan. 30, 2018

(65) Prior Publication Data
US 2019/0236743 A1    Aug. 1, 2019

(51) Int. Cl.
| G06Q 50/30 | (2012.01) |
| G06Q 20/40 | (2012.01) |
| G06Q 20/32 | (2012.01) |
| G06Q 30/06 | (2012.01) |
| G01C 21/34 | (2006.01) |

(52) U.S. Cl.
CPC ......... *G06Q 50/30* (2013.01); *G01C 21/3423* (2013.01); *G06Q 20/322* (2013.01); *G06Q 20/40* (2013.01); *G06Q 20/407* (2013.01); *G06Q 30/0605* (2013.01); *G01C 21/3438* (2013.01); *G06Q 2240/00* (2013.01)

(58) Field of Classification Search
CPC ...... G06Q 50/30; G06Q 20/322; G06Q 20/40; G06Q 20/407; G06Q 30/0605; G06Q 2240/00; G06Q 10/02; G06Q 10/03; G01C 21/3423; G01C 21/3438
See application file for complete search history.

(56) References Cited

U.S. PATENT DOCUMENTS

| 2004/0010427 | A1* | 1/2004 | Barnes | G06Q 10/02 705/5 |
| 2004/0252400 | A1* | 12/2004 | Blank | G06F 16/40 360/70 |
| 2009/0003552 | A1* | 1/2009 | Goldman | G06Q 10/107 379/88.22 |
| 2014/0100930 | A1* | 4/2014 | Lopez | G06Q 30/0222 705/14.23 |
| 2014/0278616 | A1* | 9/2014 | Stone | G06Q 10/025 705/6 |
| 2016/0239832 | A1* | 8/2016 | Knorr | H04L 63/02 |
| 2017/0301160 | A1* | 10/2017 | Somani | H04W 4/80 |

OTHER PUBLICATIONS

Engst, Adam, "How to Set Up and Use Airline Boarding Passes in Wallet", Mar. 13, 2017, https://tidbits.com/2017/03/13/how-to-set-up-and-use-airline-boarding-passes-in-wallet/ (Year: 2017).*

* cited by examiner

*Primary Examiner* — Kevin H Flynn
*Assistant Examiner* — Michelle E Carey
(74) *Attorney, Agent, or Firm* — Zagorin Cave LLP; Robert W. Holland

(57) ABSTRACT

Multimodal transportation planning and access provided through personal computing devices leverages visually identifiable identicons that authorize transportation on a transportation asset. Identical identicons on a traveler's personal computing device and a transportation professional's device indicate by their matching authorization by the traveler to access the transportation asset.

7 Claims, 6 Drawing Sheets

TRANSPORTATION ASSET MANAGEMENT BY VISUALLY DISTINGUISHABLE IDENTICONS

BACKGROUND OF THE INVENTION

Field of the Invention

The present invention relates in general to the field of transportation asset management, and more particularly to transportation asset management by visually distinguishable identicons.

Description of the Related Art

Ride sharing has changed transportation in many urban areas. Conventional urban transportation has generally relied upon mass transportation assets, such as bus and train scheduled routes, which typically call for some rider familiarity in order to travel efficiently. Individualized transportation, such as taxi and limo services, tended to cost too much for the masses to use. With widespread availability of mobile telephones and wireless data service, ride sharing companies have connected car owner/operators with riders through apps to provide ready transportation at the press of a button. The supply of available rides has driven down costs, so that has become more practical from a personal cost perspective of a traveler.

One disadvantage of the ride sharing approach is that the convenience of using an app has steered riders to ride sharing transportation even where other conventional transportation options might better meet the needs of riders. Generally, transportation asset management involves a balance between cost and time. For example, a ride share might get a commuter to a destination more quickly than public transportation options, but at a greater personal and societal cost that is often overlooked. For instance, a traveler can often get to a destination with a short walk to a bus stop and a bus ride that lasts a short time longer than the ride share. Efficient shared use of the bus as a transportation asset reduces road congestion, fuel consumption and pollution in the urban area. In many instances, riders often tend to prefer the simplicity of a one vehicle transportation option even with its greater personal financial cost because riders simply do not understand the public transportation options available.

Often mass transportation options available in urban areas are run by different government entities that coordinate travel options through regional transportation organizations. Typically, each transportation option manages payment and scheduling within its own organization in a manner that balances the cost of the transportation service and number of travelers. For example, frequent bus riders typically purchase a pass that allows travel for a defined time period or number of trips where each trip has a nominal cost. As a comparison, more expensive travel options, such as a train, tend to track individual trips where each traveler has a ticket for each trip. Travelers may typically purchase tickets ahead of time or at the time of boarding the vehicle. Generally, if a traveler wants to use different transportation assets run by different transportation entities, the traveler coordinates each trip separately. Even where the traveler has an option to obtain multiple tickets through one purchase process, the traveler typically has to keep a separate ticket for each travel option.

SUMMARY OF THE INVENTION

Therefore, a need has arisen for a system and method which tracks multimodal transportation assets to coordinate urban travel for individuals.

In accordance with the present invention, a system and method are provided which substantially reduce the disadvantages and problems associated with previous methods and systems for coordinating travel across private and public transportation assets. Access to a transportation asset is managed by distribution of visually distinct identicons that authorize a traveler to use the transportation asset. The traveler preauthorizes a travel expenditure to receive one or more identicons associated with a travel event, such as with a download of the identicons to a mobile computing device. An operator of the transportation asset is presented with an identical identicon for access to the transportation asset at the time and location of the preauthorized travel so that the operator authorizes entry onto and transportation by the transportation asset if a traveler's identicon matches the operator's identicon. Each identicon is, for example, automatically generated from defined information to create a uniquely identifiable visual image that the transportation asset operator can verify with a visual comparison.

More specifically, a traveler preauthorizes a charge for travel on a public transportation asset and downloads one or more identicons that authorize access to the transportation asset. For example, an identicon is a visual image presented on a mobile computing device that matches an identicon on a mobile computing device of a transportation professional that authorizes access to a transportation asset. With a mass transportation asset, such as a bus, an identicon may authorize access to the bus based on time of day or location, such as a bus stop, so that all riders entering the bus have the same identicon as the bus driver. In one example embodiment, the identicon for an asset changes at a regular interval, such as every minute or every stop. For example, travelers who preauthorize travel download a set of identicons for the transportation asset that each match the identicons of the transportation asset professional. In one embodiment, a traveler has the preauthorized charge applied when the traveler calls up an identicon for presentation. In an alternative embodiment, the preauthorized charge is applied when the time for the transportation asset use has passed provided the traveler has not canceled the preauthorization. A traveler is able to traverse multiple types of transportation assets managed by multiple assets using the simple presentation of the identicon at entry to each transportation asset.

The present invention provides a number of important technical advantages. One example of an important technical advantage is that a traveler accesses multimodal transportation assets across multiple public and/or private transportation providers with a visual pass that is not tracked by digital data presented in the pass. The visual pass, referred to herein as an identicon, is presented by a mobile computing device, such as a smartphone, based upon a preauthorization paid for by the traveler. Rather than digitally scanning the identicon, a transportation professional compares a traveler's identicon to the transportation professional's own identicon to authorize transportation if a visual match exists, such as where both the traveler and transportation professional have identical identicons. In one example embodiment, the identicon has animation that plays in a synchronized manner by reference to a common clock, such as a GPS or cellular network time reference. In one example embodiment, a traveler may have the same identicon for presentation to access multiple transportation assets, such as a bus followed by a rideshare. Simplified access encourages travelers to take advantage of public transportation assets while leveraging more expensive private enterprise transportation assets when it is efficient to do so. Public transportation entities reduce costs and simplify accounting by avoiding expensive equipment that tracks travelers on each transportation asset.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A strong public interest is served by encouraging the use of public transit in urban areas. Public transit reduces pollution, fuel consumption and road congestion while also making travel affordable for less fortunate citizens. Government entities that run public transport often have tight budgets and difficult schedules driven by public needs. With lower cost transportation options, such as bus and subway transportation, public entities support a large number of travelers across a larger number of routes so that tracking traveler's revenue and costs can present substantial challenge. Against this background, many citizens avoid public transportation because the schedules and routes are difficult to understand, book and successfully navigate to the unfamiliar traveler. This is especially true for individuals traveling into an urban area who are unfamiliar with the public transportation. In many instances, a combination of public and private transportation assets will efficiently get travelers to a destination, yet those unfamiliar with public transportation options will forgo public routes in favor of more expensive options that are simply easier to access, understand and use, such as an app that arranges a rideshare all the way to a destination. The present disclosure proposes a simplified personal computing device application that provides a multimodal transportation solution with preauthorized transportation asset access across both public and private transportation assets. Public transportation resources can be dedicated to moving people instead unnecessarily complex accounting and competing with better funded private transportation entities.

Figure 1:
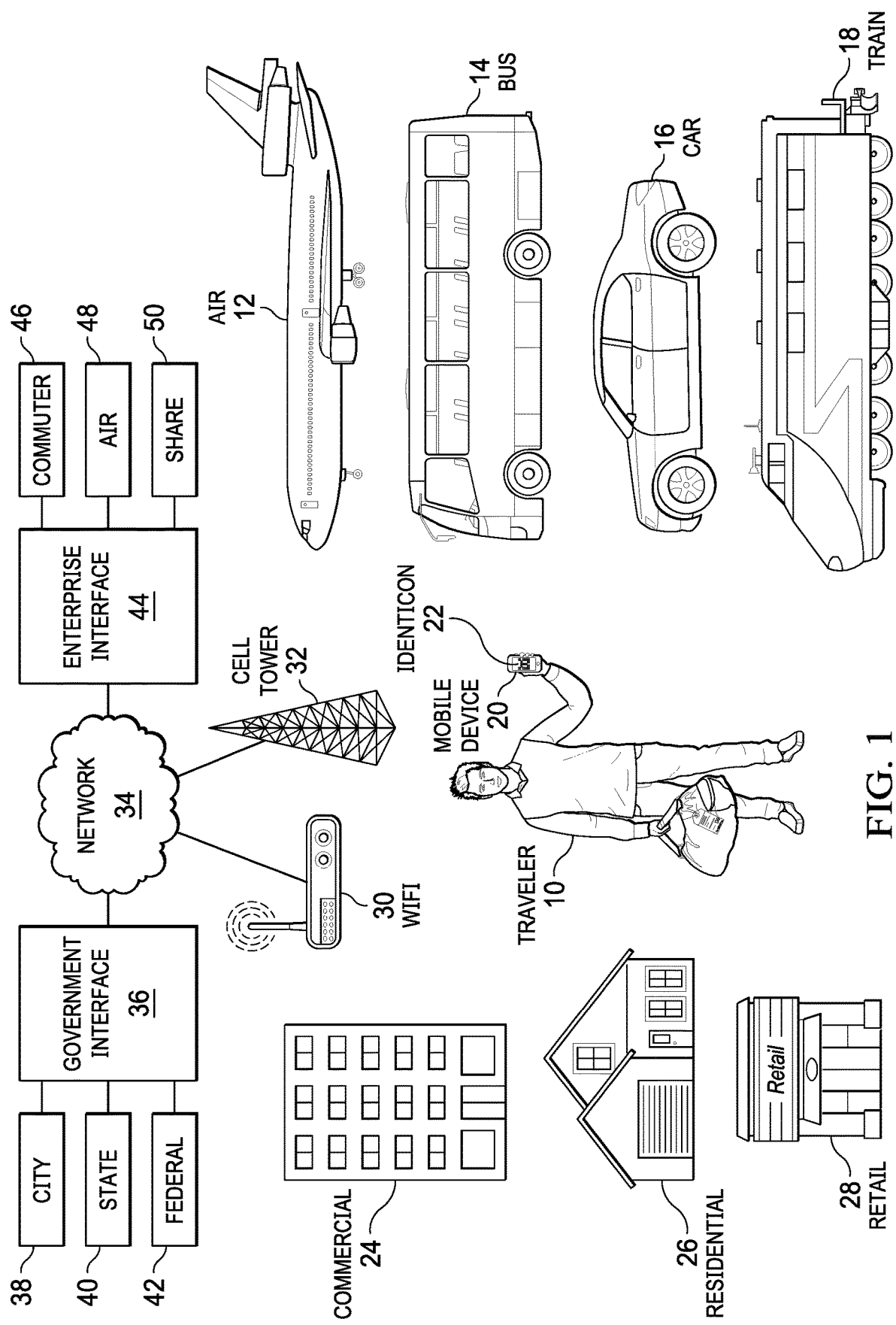
FIG. 1 depicts a block diagram of a system for coordinating multi-modal travel of an individual traveler to a destination, such as across public and commercial enterprise transportation assets.

Referring now to FIG. 1, a block diagram depicts a system for coordinating multi-modal travel of an individual traveler 10 to a destination, such as across public and commercial enterprise transportation assets. In the example embodiment, the public and commercial enterprise transportation assets include air travel, such as commercial or leased aircraft 12, bus 14 travel, such as urban mass transportation bus routes or commercial mass or leased bus/van travel companies, automobile 16 travel, such as personal, taxi or rideshare car travel, and train 18 travel, such as urban subway, light train or train assets. Individual traveler 10 interacts with a mobile computing device 20, such as a smartphone, to coordinate travel across the different transportation assets through a graphical depiction presented on a display of mobile computing device 20, such as an identicon 22. The example embodiments set forth in the following description provide an example of travel coordination that balances cost and time for the example transportation assets and are not intended to limit the scope of the disclosure to the example transportation assets or example identicon implementations.

Individual traveler 10 may start a route to a destination from a variety of locations, such as a commercial location 24 like the traveler's place of employment, a residential location 26 like the traveler's home, or a retail location 28 like a store. Alternatively, a traveler may initiate a route at an intermediate location between commercial 24, residential 26 and retail 28 start and destination locations, such as by using mobile computing device 20 to interface with a network 34, such as the Internet through WiFi 30, cell tower 32, or other communication resources. Coordination of transportation assets as depicted in the example embodiment may be performed at a centralized network location or across multiple computing platforms, including mobile computing device 20. For instance, one or more government interfaces 36 coordinates transportation asset availability and cost for city 38, state 40 and federal 42 transportation assets. As another example, one or more enterprise interfaces 44 coordinates transportation asset availability and cost for commuter 46, air 48 and ride share 50 assets. Traveler 10 receives instructions at mobile computing device 20 on how to access selected transportation assets and one or more identicons 22 that traveler 10 presents for authorization to access the transportation assets. The example embodiment addresses presentation and access of traveler 10's route through mobile computing device 20, however, in alternative embodiments, identicon 22 may be printed for presentation as a physical ticket where traveler 10 does not have a mobile computing device 20, such as by purchasing a one-time access identicon from a public computing device like a retail outlet or library. In the example embodiments, network coordination is provided through conventional computing devices, such as servers supported in a cloud infrastructure that execute instructions retrieved from non-transitory memory, such hard disk drives or solid state drives.

Figure 2:
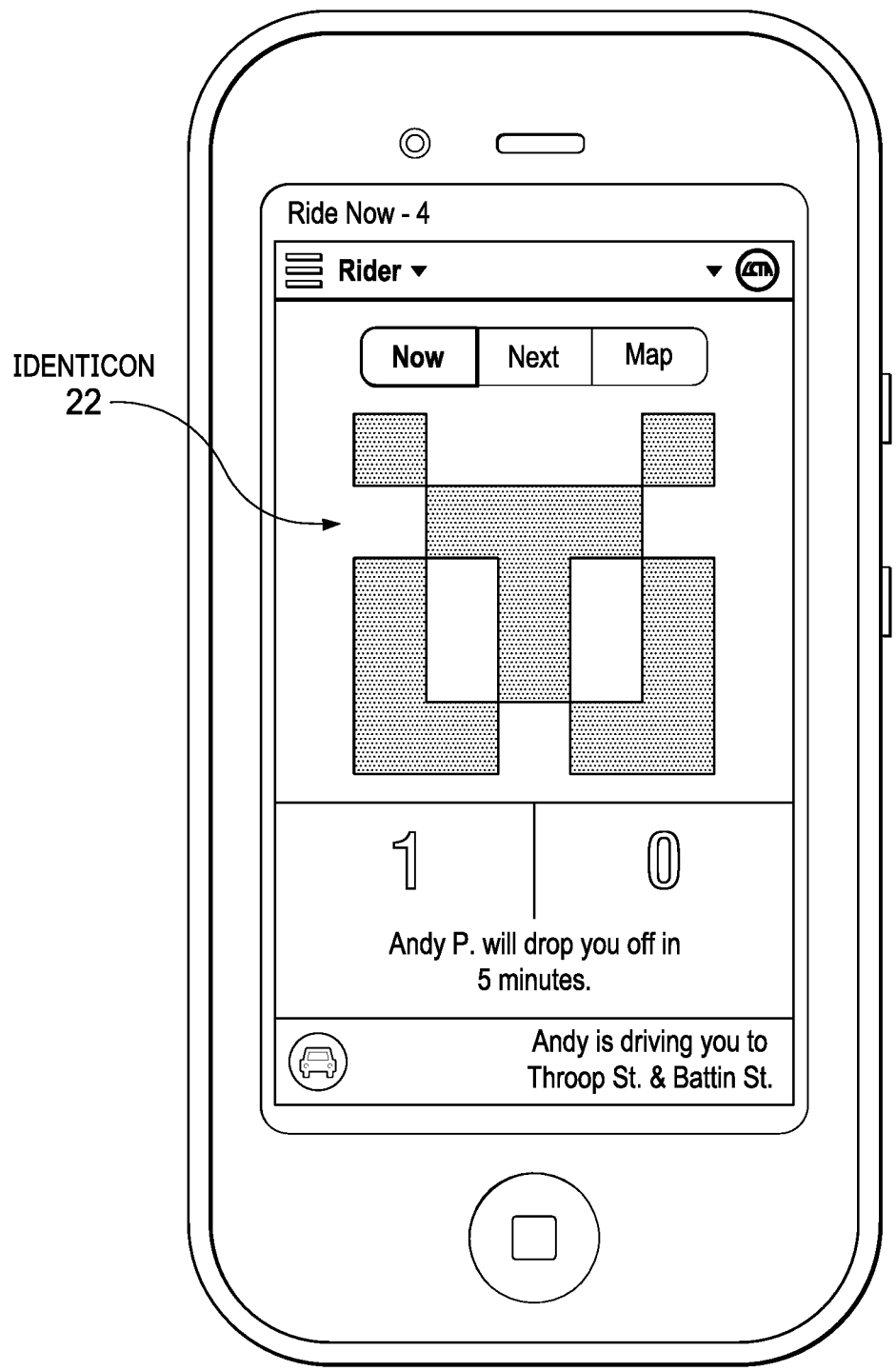
FIG. 2 depicts an example identicon that coordinates use by a traveler of one or more transportation assets.

Referring now to FIG. 2, an example identicon 22 is depicted that coordinates use by a traveler of one or more transportation assets. In the example embodiment, identicon 22 is depicted at a display of a mobile computing device 20 as a visual cue that a traveler 10 presents at a transportation asset for access based upon viewing comparison performed by a transportation asset individual, such as a driver of a bus, vehicle or train. Identicon 22 presented by a traveler 10 is compared by the transportation asset individual for a visual match to an identicon provided to the transportation asset individual that authorizes access to a transportation asset, such as downloaded to a portable computing device of the transportation professional. If a traveler 10 identicon 22 visually matches that of the transportation asset individual, the traveler 10 is provided access to the transportation asset without on-site bookkeeping or tracking measures that read data, such as a barcode. That is, a simple visual match comparison is performed for authorization to access a transportation asset without a digital reading of data from the traveler identicon 22 so that the transportation asset individual need only perform a visual comparison and need not rely upon a computer, optical reader, wireless communication interface or other data transfer from the traveler's display presentation before letting the traveler have access to the use of the transportation asset. As an example, a new identicon 22 is generated at a one minute time interval at the mobile computing device 20 of traveler 10 and at a transportation asset individual so that the traveler 10 will have a constantly updated identicon that matches the travel asset individual's identicon for the instances where traveler 10 is authorized access to the transportation asset. As an alternative example, identicon 22 updates at each stop of a transportation asset, such as where identicon 22 authorizes access by all individuals at a stop along a route who have a matching identicon. Other examples of identicon use are described in greater detail below.

Identicon 22 is, in one example embodiment, an automatically-generated image or animation presented at a display, such as a smartphone display. In one example embodiment, identicon 22 is created from a set of input values to have a visually distinct and unique appearance. The notion of an identicon is to have a rapid visual comparison by a human eye to confirm a match of two identicons, one that identifies access associated with a transportation asset and one that indicates authorization of a traveler to use the transportation asset through a visual match. Although identicons are digitally generated, easy visual identification by a human eye is the goal, not a comparison of digital values captured in the identicon, such as might be done by an optical text reader or bar code reader. That is, as used herein the term identicon does not indicate an algorithmic comparison of data included in a visual image, such as with a two-dimensional bar code or similar bar code read by an optical scanner. Rather, the term identicon as used herein indicates a visual depiction for visual comparison by the human eye without a transfer of data from the visual depiction. Visually distinct and unique identicons allow a transportation professional to quickly and easily authorize a traveler to use a transportation asset without relying on a machine and without tracking the traveler's identity or cost of travel at the transportation asset. The identicon allows the transportation professional to permit access by a traveler to the transportation asset without transferring digital data from the identicon or tracking entry by the traveler with information of the identicon.

Information to generate an identicon may come from details related to the transportation asset, the transportation professional operating the transportation asset, the transportation route, and/or the traveler. For example, at the start of a bus driver's day, bus routes assigned to the bus driver are determined and associated with locations, such as GPS locations, times, such as planned departure and arrival times, and the bus driver's unique identifier so that a series of identicons are created and stored in the bus driver's smartphone or tablet. As the bus driver's route progresses through the day, different identicons are presented for the driver to use as a basis for comparison to traveler identicons for authorization of the travelers to use the transportation asset. For instance, a GPS in the driver's mobile computing device may be used as a reference that determines which identicon to present, such as a new identicon at each bus stop. As another example, a time reference, such as from a cellular telephone network or GPS, is used to determine which identicon to present, such as a new identicon every minute. As travelers enter the bus, the driver simply compares the identicon held by the traveler with that presented on the driver's mobile computing device and allows the traveler to enter the bus if a match exists. In the example embodiment where identicon's change based upon a time interval or route position, if the bus driver suspects an imposter identicon, the bus driver can have the traveler re-present the identicon at the next identicon change to ensure that the traveler did not fraudulently obtain the identicon.

Advantageously, an identicon may provide a single traveler access across multiple modes of transportation without the traveler having to hold a ticket or other authorization to access each transportation asset. For example, a traveler who takes a bus to an intermediate destination and then takes a rideshare to a final destination may load an identicon to board the bus while the same identicon is provided to the rideshare driver to authorize the rideshare from the intermediate destination to the final destination. The "strength" of the identicon may vary based upon the expense of the travel mode authorized by the identicon and/or the risk of fraud through presentation of imposter or copied identicons. Taking the above example a step further, the identicon on the traveler's mobile device may start as a still image that matches the identicon of the bus driver for the initial part of the traveler's route. Upon leaving the bus and entering the rideshare, the identicon image transitions to show an animation that starts from the identicon image used to authorize the bus ride and continues on to show a visually distinct set of images in animation form that is also stored at a mobile computing device of the rideshare driver. In one embodiment, reference to a common clock allows both mobile devices to synchronize the animations to each other so that visual matching of the animation identicons is more easily accomplished.

In the example identicon depicted by FIG. 2, the visually distinct image is built from an arrangement of blocks that have identifiable forms and colors. Underneath the identicon, the traveler is provided information about the route and the transportation assets involved in the traveler's transportation transaction. The traveler has only to show the identicon to authorize the transportation by the route and the transportation professional validating the identicon has only to visually match the traveler's identicon with the identicon provided for access to the transportation asset to authorize the traveler's use of the transportation asset. No data is read or intended to be read from the identicon and no tracking of the use of the identicon is needed at the transportation asset. As set forth below, the traveler pre-authorizes a charge when selecting a route and storing an identicon. The cost transaction related to the preauthorized charge may be triggered by any number of events that need not be tracked at the transportation asset. For example, a cost transaction may be charged when a traveler opens the identicon, whether or not the identicon is used for authorization to a transportation asset. As another example, a cost transaction may be charged if the pre-authorization is not canceled before a time that the travel is scheduled to take place.

Figure 3:
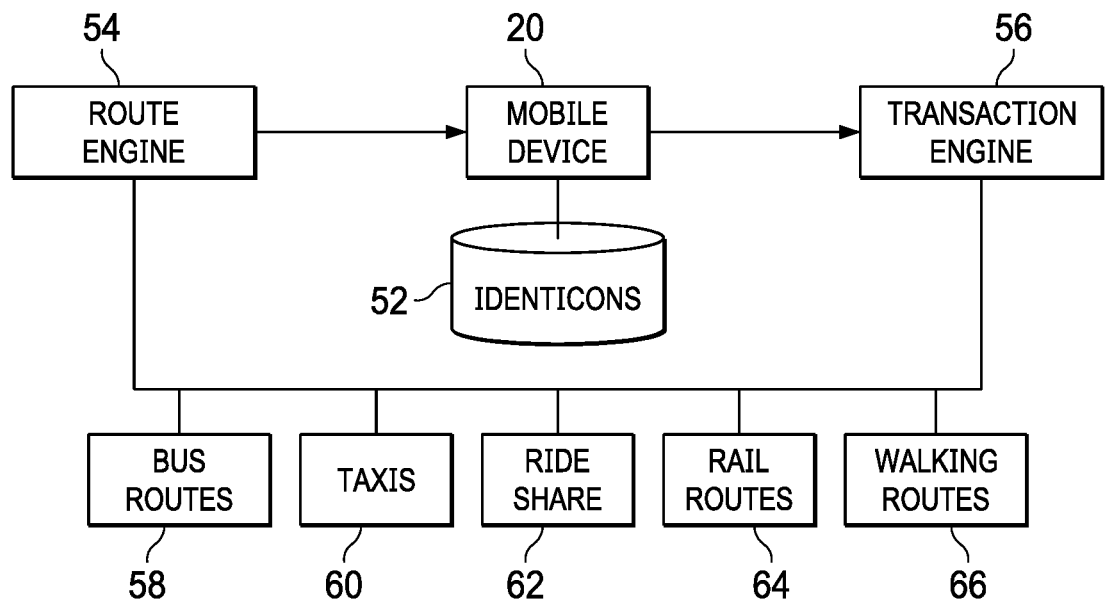
FIG. 3 depicts a block diagram of an example embodiment for pre-authorization of travel with identicons.

Referring now to FIG. 3, a block diagram depicts an example embodiment for pre-authorization of travel with identicons. In the example embodiment, mobile computing device 20 provides an interface for travelers to plan, pre-authorize and expense travel routes. Mobile computing device 20 stores route pre-authorizations as identicons in a persistent memory having an identicon database 52 and expenses the routes as the identicons are retrieved to authorize travel. Mobile computing device 20 plans a route through communication with a route engine 54 and expenses the route through a transaction engine 56. For example, route engine 54 and transaction engine 56 are stored in non-transient memory of one or more servers interfaced with the Internet and accessible by mobile computing device 20, such as the Internet. Route engine 54 executes on processing resources of the server to access available travel assets responsive to traveler requests. In the example embodiment, route engine 54 interfaces through a network with multiple modes of transportation assets available to support travel to a proposed destination. Route engine 54 queries separate transportation asset availabilities and costs to generate alternatives for a traveler to select that satisfy the traveler's travel time and expense constraints. Once the traveler selects a route, transaction engine 56 allocates cost to the selected transportation assets and associates the cost with identicon usage as set forth in greater detail below.

Figure 4:
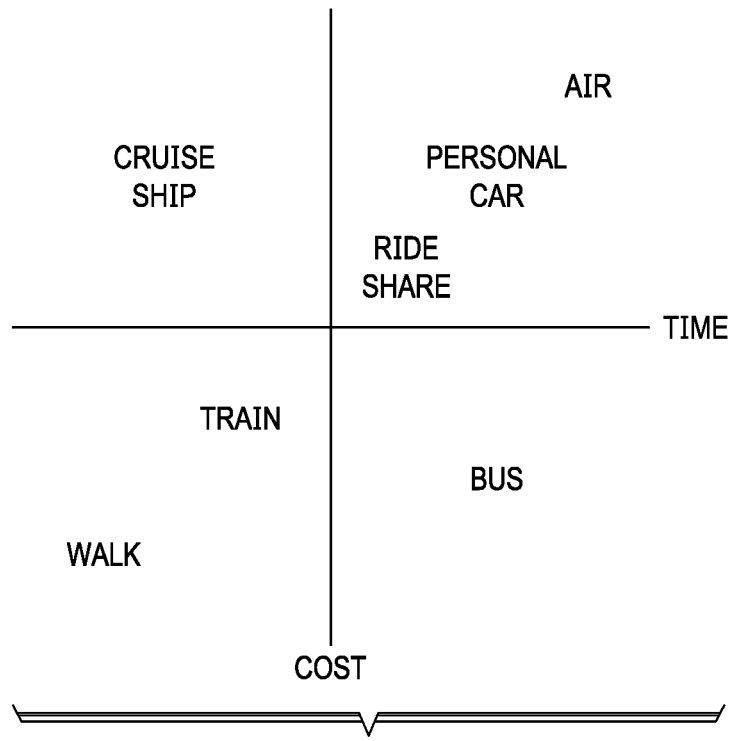
FIG. 4 depicts a transportation assets defined by speed and cost.

An example usage helps to illustrate interaction between route engine 54 and transaction engine 56 to support a transportation transaction through presentation and visual matching of an identicon. As an example, a traveler plans to travel from his home to an office of his employer in a different city. Through mobile device 20 the traveler inputs a starting location and time, a destination location and time, and other constraints, such as budget and travel time flexibility. FIG. 4 provides an example of how expense and travel time vary across different types of transportation assets, such as may be considered by route engine 54 when proposing routes. Multimodal transportation options provided as options in FIG. 4 include rapid and expensive options, such as air, personal vehicle and rideshare transportation, slow yet expensive options, such as a cruise ship, slower and less expensive options, such as bus and train transportation, and slow inexpensive options, such as walking. Route engine 54 considers all available options for the traveler by querying asset availability and cost from transportation modalities disposed along the route, such as a bus route server 58, a taxi server 60, a ride share server 62, a rail route server 64 and walking routes 66. In one embodiment, route engine 54 requests cost bids from each transportation asset, such as by auctioning route transportation options to obtain the best available pricing. Such an embodiment aids the transportation modalities by encouraging transportation assets use in an efficient manner, such as by lowering ticket prices if fixed costs for a trip segment are met, or raising ticket prices if fixed costs associated with additional travelers does not justify assignment of additional transportation assets in a particular modality. In one embodiment, the transportation asset auctioning may include bids by travelers for preferred assets where availability is limited, such as if an airplane is near full.

Once route engine 54 has configured route options within the traveler's constraints, the traveler is presented the route options at mobile computing device 20 to select a route for purchase or scheduling. The route selection is passed to transaction engine 56 to secure the transportation assets for the selected route segments and pass identicons to mobile computing device 20's identicon database 52. The type of identicons and transaction tracking enforced by transaction engine 56 may vary depending upon the relative cost of the transportation asset involved and other factors. For example, a bus identicon transaction may be managed by sending to mobile computing device 20 a set of identicons that visually match the selected bus route over the time period that the traveler will enter the bus to use the purchased bus ride. For instance, each bus route may have an identicon assigned for each minute of the day so that the traveler is provided with a set of the day's identicons for the time period around which the user will enter the bus. Alternatively, a particular identicon may be assigned for entry at a particular route location and time. In a preferred embodiment, identicons are stored as images or animations in a secure area that restricts access by a traveler to the identicon until the traveler is prepared to apply the pre-authorization represented by the identicon by selection of the identicon to use the identicon's associated transportation asset. In an alternative embodiment, an identicon formula is stored in a secure location on the mobile computing device to generate an identicon at selection by a user for use of a transportation asset. Transaction engine 56 may apply similar identicon transaction tracking and storage for mass transit transportation assets similar to bus assets, such as trains, light rail and subways.

Transaction engine 56 may apply more precise identicon tracking with greater security as the transportation asset increases in cost. Generally, more expensive transportation assets involve greater involvement by the transportation professional managing the transportation asset. For example, a rideshare might involve a single driver and a single rider; however, from a cost tracking perspective of the traveler, the rideshare is a segment of a route. Transaction engine 56 may provide greater security for rideshare and similar higher-cost identicons by including animation or more complex identicon images that are difficult to replicate, such as by using personal information associated with the traveler as part of the identicon generation. Additional security may be included for managing application of pre-authorized travel as costs through identicon use. For example, presentation of the identicon may be withheld until the traveler is within a limited time or location relative to the start of the transportation segment. As another example, the identicon cost is applied upon selection of the identicon by the traveler, however, selection of the identicon is protected by a password of the traveler and/or a warning that selection of the identicon applies the cost and risks exposure of the identicon to access by an unauthorized individual.

The traveler is assessed a cost based upon pre-authorization when a condition is met, such as presentation of the identicon, which retrieves the identicon from secure storage and makes the identicon public. With such a condition, the identicon access is reported from mobile computing device 20 to transaction engine 56 for cost allocation. Alternatively, a cost may be applied if the traveler has not canceled the identicon as of the time at which the transportation asset is scheduled. In one alternative embodiment, cost may be applied upon transfer of the identicon to the mobile computing device 20. Advantageously, tracking of identicon presentation is not needed at the transportation asset so that data reading or transfer related to the identicon is not performed by a transportation professional, such as a bus driver. Rather, a visual check for a match to the transportation professional's identicon authorizes access of the traveler to the transportation asset.

Figure 5:
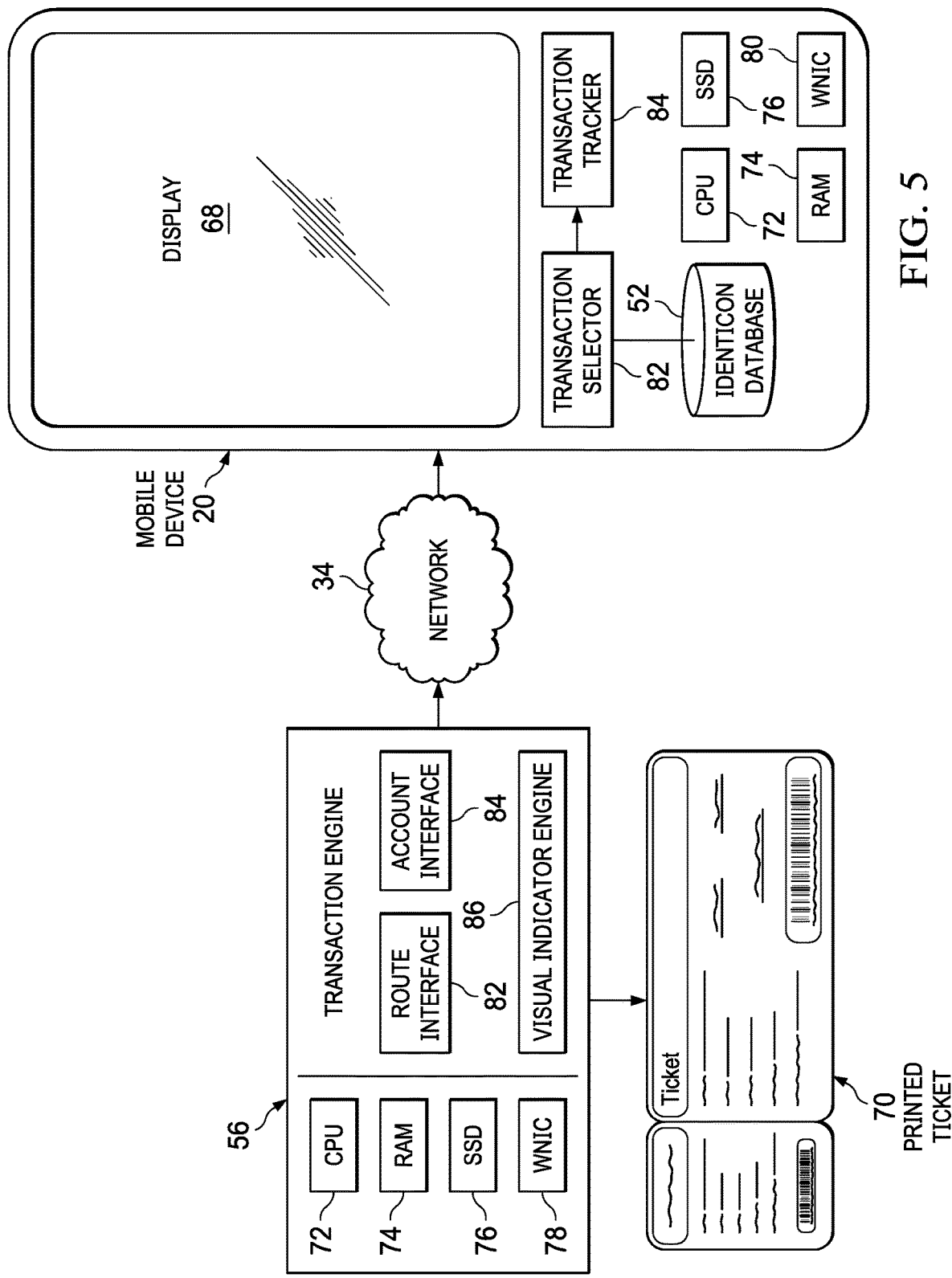
FIG. 5 depicts a block diagram of an example embodiment of a transaction engine configured to interact with a mobile computing device.

Referring now to FIG. 5, a block diagram depicts an example embodiment of transaction engine 56 configured to interact with mobile computing device 20. Transaction engine 56 executes as instructions on a server computer, such as an application executing on a central processing unit (CPU) 72 and stored in random access memory (RAM) 74. For example, transaction engine 56 is stored in a solid state drive (SSD) 76 or other persistent non-transient memory and retrieved to execute over a virtual machine in a cloud infrastructure. A network interface card (NIC) 78 supports network communication by transaction engine 56, such as with a local area network (LAN) that interfaces with the Internet. Alternatively, transaction engine 56 may execute on a client device that interfaces through the Internet to support generation of physical printed identicon tickets 70, such as a client in a retail location or library. Transaction engine 56 retrieves available routes through a route interface 82 interfaced with route engine 54 and pre-authorizes costs for selected routes with an account interface 84 that ties into traveler payment options, such as an account having a credit card or other payment methods.

Mobile computing device 20 interfaces with transaction engine 56 through network 34 to receive identicons and report completed transportation transactions. Mobile computing device 20 has a CPU 72 that executes instructions stored in RAM 74, such as instructions of an application stored in persistent non-transitory memory of a solid state drive (SSD) 76. A wireless network interface card (WNIC) 80 supports communications with network 34 to transfer identicon and transaction information. In the example embodiment, an app executes on mobile computing device 20, such as over iOS, Android or Windows operating systems, to interface a traveler with transportation transactions, such as downloading and storing identicons in identicon database 52 with pre-authorized travel and applying identicons to authorize or cost transportation transactions. In the example embodiment, a transaction selector 82 presents transaction options to a traveler for the travel to select as pre-authorized routes. For instance, transaction selector 82 receives a traveler pre-authorization for a presented route and, in response, retrieves and stores one or more identicons associated with the route. Once a route is pre-authorized, transaction tracker 84 manages application of the pre-authorization to expense the transportation when pre-authorization conditions associated with the identicon are met, such as a presentation of the identicon at display 68 of mobile computing device 20. In one embodiment, tracking of use of identicons does not have to happen in real time, such as upon entry at the transportation asset. For example, a network communication does not have to exist in order to report identicon use with the use instead stored in identicon database 52 until a subsequent reporting time. In one embodiment, such as where an identicon has a high cost that is not expensed until the identicon is shown, transaction tracker may enforce some level of reporting before presenting the identicon at display 68. For instance, an acknowledgement of the traveler's authorization to cost the identicon may be presented, accepted and stored in identicon database 52 so that the traveler will have to present mobile computing device 20 should the traveler contest application of a cost for the identicon.

Figure 6:
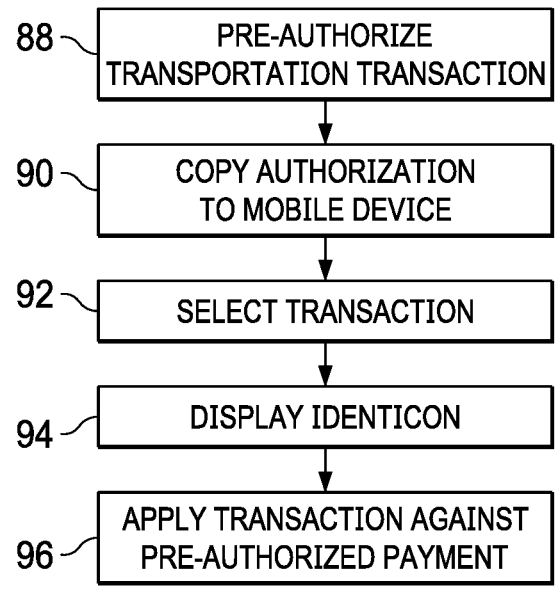
FIG. 6 depicts a flow diagram depicts a process for distributing and using identicons to authorize travel on a transportation asset.

Referring now to FIG. 6, a flow diagram depicts a process for distributing and using identicons to authorize travel on a transportation asset. At step 88, a traveler pre-authorizes a transportation transaction, such as through a mobile app by selecting a route to a destination that uses transportation assets. At step 90, in response to the pre-authorization, a copy of one or more identicons that authorize use of the transportation assets is copied to the travelers mobile computing device, such as in secure storage within the app that pre-authorized the transportation transaction. At this point in the process, the traveler has agreed to pay for the transportation but has not been charged, where the pre-authorization includes conditions that the traveler agrees will authorize a charge, such as the time for the transportation asset passing without cancellation of the identicon. Once pre-authorization is performed and an identicon copied to the traveler's mobile computing device, the traveler may initiate transportation with some anonymity as the transaction of presenting the identicon and using the transportation asset does not have to be tracked in real time. At step 92, the traveler selects the transaction to use the pre-authorized travel by, at step 94, displaying the identicon. At step 96, upon presentation of the identicon the transaction is applied against the pre-authorized travel to cost the travel against the traveler. For example, in response to presentation of the identicon, a token is stored in association with the identicon on the mobile computing device to indicate that costing of the identicon was authorized by the traveler in the event the traveler challenges the charge at a future time.

Figure 7:
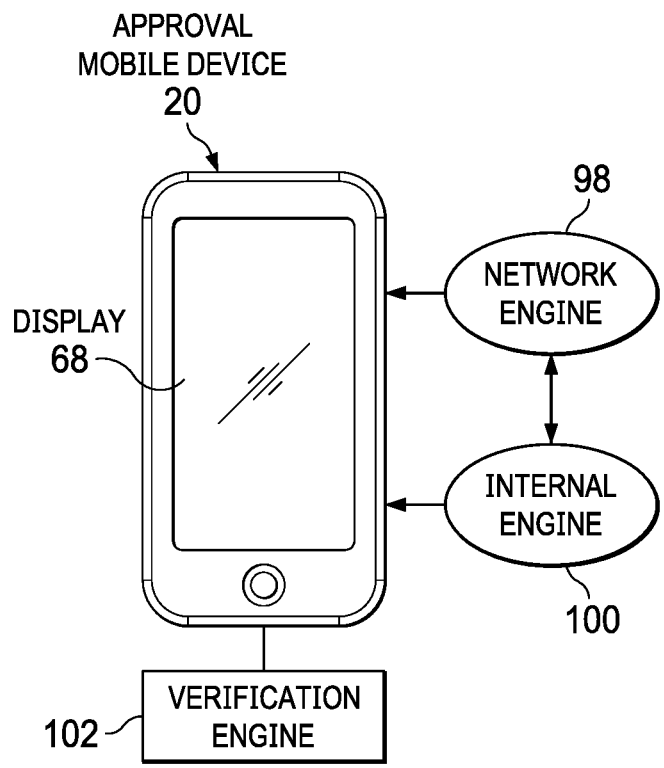
FIG. 7 depicts a block diagram of a mobile computing device configured to obtain identicons that pre-authorize travel at an account.

Referring now to FIG. 7, a block diagram depicts a mobile computing device 20 configured to obtain identicons that pre-authorize travel at an account. Although travelers typically rely on one mobile computing device 20 during travel, in some instances travelers will have multiple devices, such as a device provided by an employer and a personal device. In some instances, travelers track travel expenses differently for employer travel that is expensed to the employer and personal travel that the traveler pays for himself. To manage separate accounts on the go, the traveler may manage identicons with a network engine 98 and an internal engine 100. For example, an enterprise may host its own travel platform with an internal engine 100 that generates and tracks identicons for employees. The traveler may also interact with a personal account through a network engine 98. A verification engine 102 integrated in the mobile compute device 20 tracks the use of personal versus business identicons to allow an employer to verify that authorized travel is used for business purposes. For example, as business identicons are displayed, GPS location or other verification information may be captured by the employee mobile device and reported back to the employer to validate business travel expenses. In contrast, personal identicon use by the traveler may be kept anonymous and separate from employment records.

Figure 8:
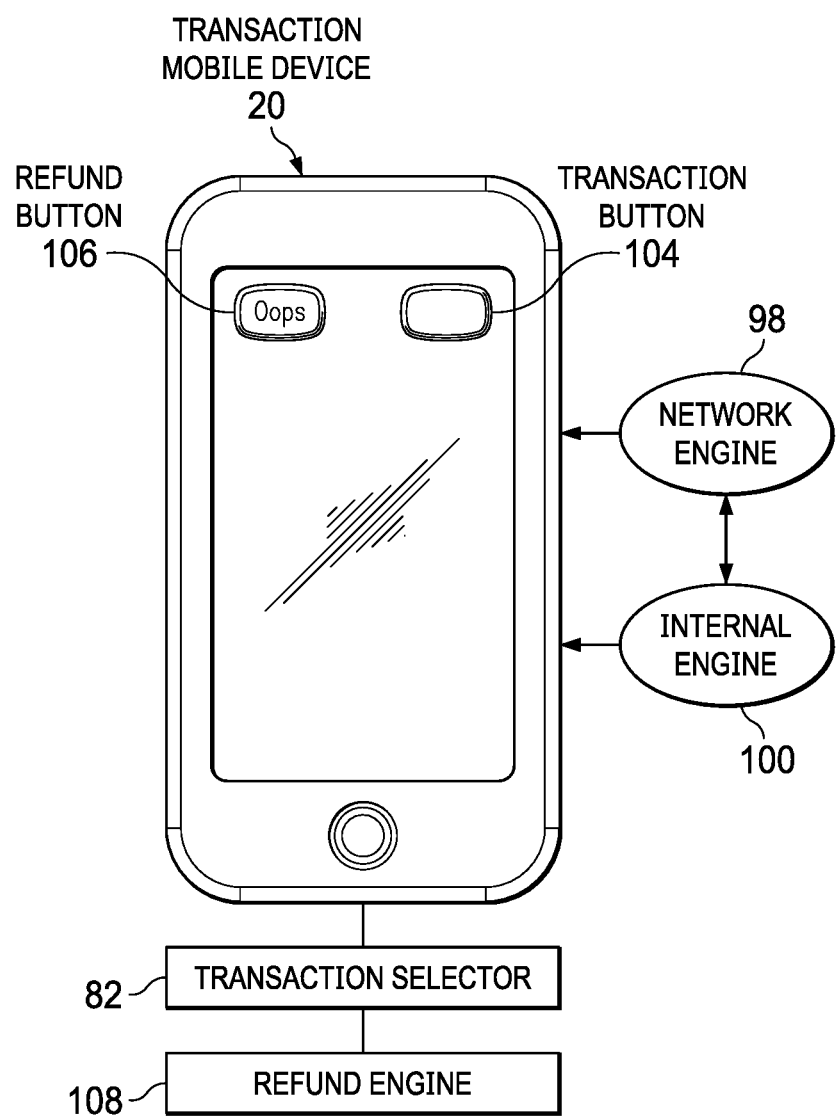
FIG. 8 depicts an example of a mobile computing device that selects identicons for presentation.

Referring now to FIG. 8, an example of a mobile computing device 20 is depicted that selects identicons for presentation. At a transportation asset, the traveler presents mobile computing device 20 and selects a transaction button 104 on the display 68 touchscreen to present an identicon that authorizes access to the transportation asset. At selection of the identicon, transaction selector 82 generates an authorization for a charge associated with the identicon, stores the charge locally on mobile computing device 20 and, in one embodiment, communicates the charge to a network based engine 98. In order to manage attempts to cheat by copying identicons that will permit multiple accesses, such as a bus access, transaction selector 82 enforces a charge upon selection of the identicon so that premature selection will result in the traveler displaying an invalid or out of date identicon at the time of access to the transportation asset. For example, the traveler is provided with a warning at selection of an identicon that the identicon will only be valid for a limited time period. If the traveler attempts to cheat the system by premature display of the identicon so that others may attempt to copy the identicon, the identicon becomes invalid and the traveler is charged for the identicon selection. In one embodiment, a refund button 106 is made available at the mobile computing device to request a refund by a refund engine 108 for an inadvertent identicon presentation. Refund engine 108 has access to identicons and identicon cost information stored at mobile computing device 20 that allows analysis of the traveler's behavior. If, for example, a traveler requests refunds repeatedly, refund engine 108 may place tighter constraints upon the traveler related to the selection of identicons and refunding of charge authorizations. For instance, if refund behavior indicates that a traveler prematurely presents identicons in an attempt to copy the identicons for use by others, the traveler may be restricted to a smaller identicon presentation window or GPS location relative to travel authorized by the identicon on a transportation asset. Further, refund requests will be more readily denied where a traveler's behavior indicates an attempt to game the system. As an example, with a bus identicon that changes every minute, upon selection of the identicon a traveler may be provided with 5 minutes of changing identicons so that the traveler has a window of time to enter the bus. In contrast, a traveler you shows dishonest behavior may be provides with a more limited window or just one identicon so that the traveler will have more difficulty copying an identicon in a timely manner that would allow cheating.

Although the present invention has been described in detail, it should be understood that various changes, substitutions and alterations can be made hereto without departing from the spirit and scope of the invention as defined by the appended claims.

What is claimed is:

1. A system for multimodal transportation of individuals allocated by identicons, the system comprising:
    a server interfaced with a network, the server having processing resources to execute instructions and non-transitory memory to store the instructions, the instructions when executed on the server processing resources operable to:
    receive a starting location and a destination from a client device interfaced with the server through the network;
    generate one or more routes from the starting location to the destination using one or more transportation modes, each route having route information;
    communicate the one or more routes to the client device;
    receive from the client device a selection of one route from the one or more routes;
    generate one or more identicons from the route information associated with the selection, the one or more identicons having a visually distinguishable presentation that authorizes access to the selected route;
    and communicate the one or more identicons to the client device;
    the client device interfaced with the network, the client device having processing resources to execute instructions and non-transitory memory to store the instructions, the instructions when executed on the client device processing resources operable to:
    store the identicon in non-transitory memory having restricted access;
    retrieve the identicon from the non-transitory memory in response to an end user authorization;
    and present the identicon at a display integrated with the client device, the identicon visually matching an authorization identicon that authorizes access to the route;
    a transaction engine stored in the server non-transitory memory having instructions that when executed on the server processing resources is operable to:
    pre-authorize an expense to the client device upon storing of the identicon at the client device;
    and apply the pre-authorized expense at a route start time; and
    a transaction engine stored in the client device non-transitory memory having instructions that when executed on the client device processing resources is operable to:
    track client device access to the identicon;
    and reverse the applied expense if the identicon remains unaccessed after the route start time.

2. The system of claim 1 further comprising:
    a route client device interfaced with the server through the network, the route client device having processing resources to execute instructions, non-transitory memory and an integrated display to present visual images, the instructions when executed on the processing resources operable to:
    receive from the server plural identicons, each identicon associated with one of plural routes, each route having route information;
    and present one identicon at each route as an authorization identicon, the authorization identicon authorizing visually matching identicons to access the route.

3. The system of claim 2 wherein the route identicon comprises an animation that plays on both the client device and the route client device.

4. The system of claim 3 wherein the animation synchronizes on the client device and the route client device by reference to a common clock source.

5. The system of claim 2 wherein the route comprises a scheduled time at the start location and the identicon restricted access is released for a predetermined limited time window relative to the scheduled time.

6. The system of claim 5 wherein identicon restricted access is further released for a predetermined proximity to the route start based upon a location detected at the client device.

7. The system of claim 2 wherein:
    the client device stores plural identicons for the selected route, each identicon associated with a time period;
    the route client device stores the plural identicons for the selected route, each identicon associated with a time period;
    and the route client device presents one of the route identicons at each time period and associated with the time period, and wherein the client device is authorized to access the route if the client device has a visually identical identicon presented at a time period as presented by the route client device.

* * * * *